Patented Mar. 5, 1929.

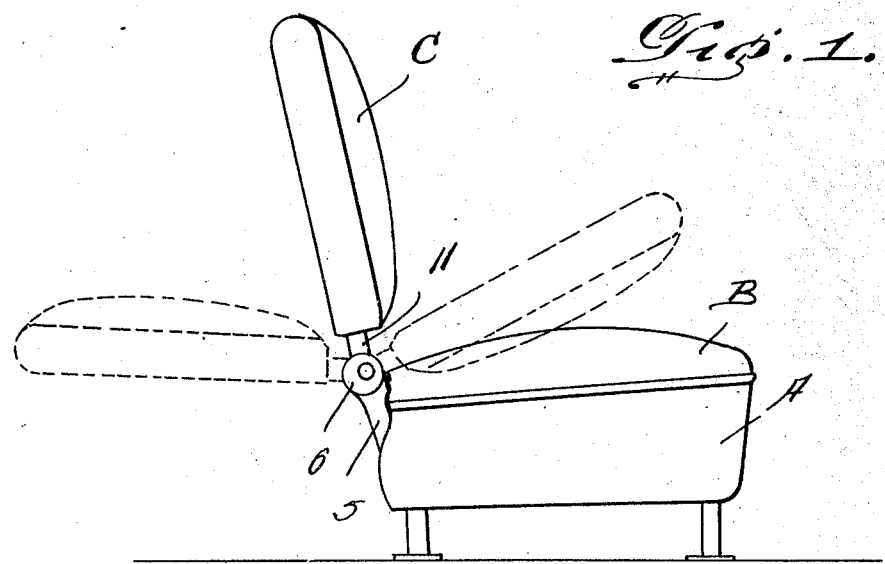
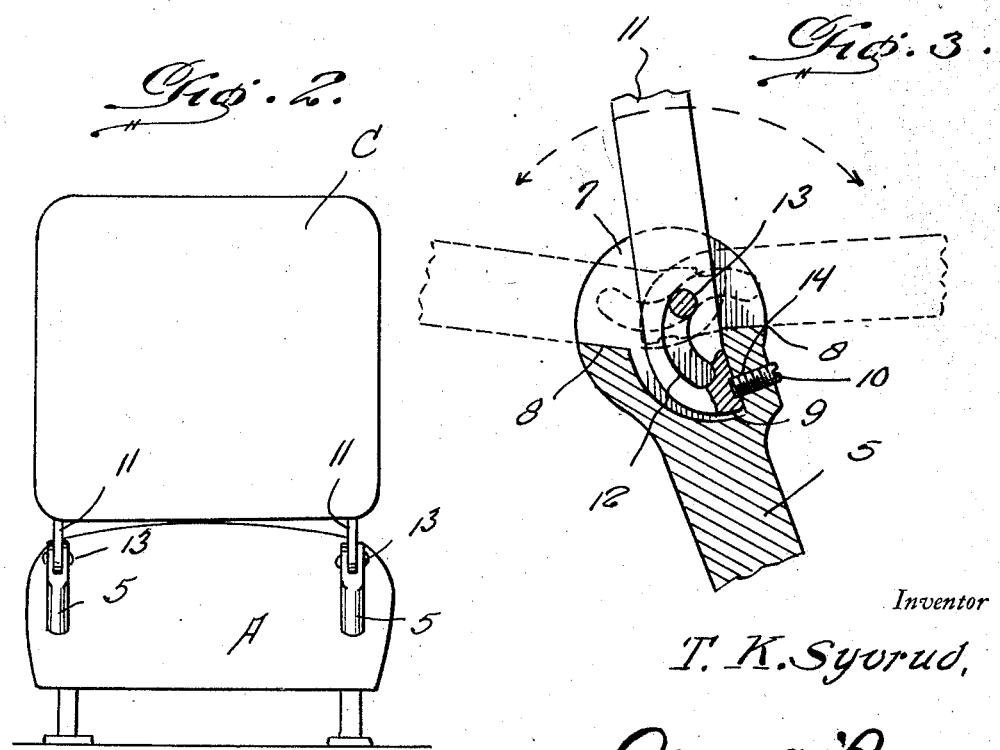

1,703,969

UNITED STATES PATENT OFFICE.

THOMAS K. SYVRUD, OF MOUNT HOREB, WISCONSIN; J. FOSSHAGE ADMINISTRATOR OF SAID THOMAS K. SYVRUD, DECEASED.

HINGE CONSTRUCTION.

Application filed May 7, 1927. Serial No. 189,642.

This invention relates to new and useful improvements in hinges, and aims to provide a highly novel, simple and efficiently operating hinge primarily, though not specifically adapted for use with the attachment of the back rest of an automobile seat, to the seat body, so that the back rest may be rigidly supported in substantially vertical position, or turned over into a substantially horizontal position toward or away from the seat construction.

By reason of a hinge of this character, when used on single seats of the front of an automobile body of the two-door closed type, ready access may be had to the interior of the car or an easy exit may be had therefrom by merely swinging the back rest into position upon the seat proper.

On the other hand, by reason of such construction, said back rest may be swung rearwardly for cooperating with its seat and the seat member of the back seating arrangement to provide a bed or couch within the interior of the car.

One of the most important objects of the invention, is to provide such a hinge wherein the back rest may be easily swung in a forward or rearward direction or wherein said back rest may be rigidly disposed in an upwardly extending position with respect to the seat so as to provide a support for the back of the occupant disposed upon the seat.

With the foregoing and other objects in view it will be seen that other objects and advantages of the invention will become apparent from the following description when taken in connection with the drawing.

In the accompanying drawing forming part of this application:—

Figure 1 is a side elevation of a conventional single automobile seat, wherein the back rest thereof is hingedly connected to the seat frame by reason of a pair of hinges constructed in accordance with the present invention.

Fig. 2 is a rear elevational view of the seat construction more clearly disclosing the pair of hinge units, and Fig. 3 is an enlarged detail fragmentary section through the hinge, the back rest member being disclosed in full line upwardly extending position and in dotted lines forwardly and rearwardly extending position.

Now having particular reference to the drawing, A designates the frame of the conventional single seat now employed in coach types of automobiles, and upon the top of which is arranged the seat cushion B, the back rest being designated by the reference character C. In carrying out my invention, said back rest is hingedly secured to the frame A of this design of seat, at the rear end thereof through the medium of a pair of hinges constructed in accordance with the present invention.

Both hinges are of identical construction and a description of one will suffice for both. Each hinge consists of an upwardly and slightly rearwardly extending post 5 anchored at its lower end to the back side of the seat frame A. The upper end of this post is of generally circular formation as indicated by the reference character 6, the upper edge of this circular portion being bifurcated as at 7, this bifurcation forming a pair of stop shoulders 8—8 at the opposite ends of said bifurcation.

At the lower edge of this bifurcated end 7, the rounded end 6 of the post 5 is formed with a socket 9, the rear and bottom walls of which are formed to describe a segment of a circle while the forward wall is plano and slightly inclined as indicated in Fig. 3. Threaded through the forward wall of this socket 9 is a set screw 10 for a purpose hereinafter more fully described.

Each hinge further consists of a flat-like arm 11 depending from the lower edge of the back rest C, the lower end of each arm being arranged within the bifurcation of the seat frame post 5. Furthermore, the back and bottom edge of each arm 11 merge together to form the segment of a circle also as clearly indicated in Fig. 3, the width of the lower end of the arm being substantially less than the width of the socket 9 in the post 5.

The forward edge of the arm 11 at its lower end is inclined to a degree similar to the inclination of the forward wall of the post socket 9, so that when the arm 11 is arranged in an upward direction with respect to the post, said forward edge at its lower end will snugly bind against the front wall of the post socket 9 as indicated.

Furthermore, the lower end of this arm 11 is formed in a longitudinal direction with an arcuate shaped slot 12 while extending therethrough is a pivot pin 13 extending through the bifurcation 7 of the post 5 directly above the socket 9, it being obvious that when the arm is arranged in the position indicated in Fig. 3, the upper end of the slot 12, will bind against the pivot 13 while the lower end of the arm at its forward edge will bind against the forward wall of the post socket 9. To adjust the angularity of the back rest attached arm 11 with respect to the post the set screw 10 may be turned inwardly or outwardly. The inner end of the screw engaging within a socket 14 upon the lower end of the arm for preventing accidental raising of the arm with respect to the post.

When it is desired to swing the back rest C forwardly or rearwardly as indicated by the dotted lines in Figures 1 and 3, it is only necessary in the first instance to merely push the back rest in a forward direction while on the other hand, to swing the back rest rearwardly, a movement in a forward direction must be first performed until the lower edge of the slot 12 is engaged in the pin 13, after which the seat C may be swung rearwardly so that the end of the arm will pass beyond the forward wall of the socket 9.

When the back rest C is swung downwardly, in either a forward or rearward manner, the arm 11 will rest upon the shoulders 8—8 of the opposite ends of the post bifurcation 7.

It will thus be seen that I have provided a highly novel, simple, and efficiently operating hinge construction for the back rest of automobile seats that is well adapted for all of the purposes heretofore designated, and even though I have herein shown and described the invention as consisting of certain detail structural elements, it is nevertheless to be understood that some changes may be made therein without affecting the spirit and scope of the appended claim.

Having thus described my invention, what I claim as new is:—

In a hinge of the character described, a post, a bifurcated extension upon the upper end of said post, said post being formed with a pocket at the bottom of said bifurcation, said pocket being undercut at one end wall thereof and its opposite end wall of arcuate and sloping formation, an arm curved at its lower end and provided with a laterally disposed portion adapted to engage under the undercut wall of the pocket when the arm is disposed within the pocket, the curved portion of said arm being adapted to engage the arcuate wall of the pocket when the arm is in upright position, while the curved portion of the arm is adapted to ride on the arcuate wall of the pocket when it is desired to disengage the end of the arm from the pocket.

In testimony whereof I affix my signature.

THOMAS K. SYVRUD.

CERTIFICATE OF CORRECTION.

Patent No. 1,703,969.                                    Granted March 5, 1929, to

THOMAS K. SYVRUD.

It is hereby certified that the name of the Administrator in the above numbered patent was erroneously written and printed as "J. Fosshage" whereas said name should have been written and printed as "I. Fosshage", as shown by the records of assignments in this office; and that the said Letters Patent should be read with this correction therein that the same may conform to the record of the case in the Patent Office.

Signed and sealed this 28th day of January, A. D. 1930.

M. J. Moore, (Seal)                                         Acting Commissioner of Patents.